United States Patent
Stojkovic et al.

(10) Patent No.: US 9,738,204 B1
(45) Date of Patent: Aug. 22, 2017

(54) TAILGATE RAMP APPARATUS

(71) Applicant: Ford Global Technologies, LLC, Dearborn, MI (US)

(72) Inventors: Dragan B. Stojkovic, Taylor, MI (US); Jack Marchlewski, Saline, MI (US); Joshua R. Hemphill, Whitelake, MI (US); Robert Reiners, Grosse Ile, MI (US); Steve William Gallagher, Bloomfield Hills, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 15/294,961

(22) Filed: Oct. 17, 2016

(51) Int. Cl.
*B60P 1/00* (2006.01)
*B60P 1/43* (2006.01)
*B62D 33/027* (2006.01)
*B60P 3/40* (2006.01)

(52) U.S. Cl.
CPC .......... *B60P 1/435* (2013.01); *B62D 33/0273* (2013.01); *B60P 3/40* (2013.01)

(58) Field of Classification Search
CPC ............................. B60P 1/435; B62D 33/0273
USPC ......................................................... 296/61
See application file for complete search history.

(56) References Cited

U.S. PATENT DOCUMENTS

| | | | |
|---|---|---|---|
| 5,853,281 A * | 12/1998 | Farmer | B65G 69/30 193/35 R |
| 5,971,465 A * | 10/1999 | Ives | B60P 1/435 296/61 |
| 6,135,532 A * | 10/2000 | Martin | B60P 3/36 14/71.1 |
| 6,158,797 A * | 12/2000 | Bauer | B60P 1/435 296/61 |
| 6,575,516 B2 | 6/2003 | Webber | |
| 6,764,123 B1 | 7/2004 | Bilyard | |
| 6,802,552 B2 | 10/2004 | Hunt | |
| 7,309,094 B2 * | 12/2007 | Norfleet | B62D 33/0273 296/57.1 |
| 8,007,021 B2 | 8/2011 | Pleet et al. | |
| 2007/0228761 A1 | 10/2007 | Dryja | |
| 2016/0031353 A1 | 2/2016 | DeSimone | |

* cited by examiner

*Primary Examiner* — Joseph D Pape
(74) *Attorney, Agent, or Firm* — Jason C. Rogers; Bejin Bieneman PLC (57) ABSTRACT

An apparatus for use with a vehicle tailgate includes a base, a first attachment member, a second attachment member and a ramp. The first attachment member and second attachment member are spaced apart from each other and extend from the base. The ramp is irremovably secured to the base. The attachment members are configured to be received in a latch of the vehicle tailgate.

20 Claims, 8 Drawing Sheets

TAILGATE RAMP APPARATUS

BACKGROUND

Ramps are known to be used for increasing the functionality and ease of using, loading, and unloading a bed of a vehicle. For example, wheeled vehicles, e.g., all-terrain vehicles, construction equipment, motorcycles, etc., may be rolled or driven into the bed of the vehicle. One example of a ramp is one or more wood planks having one end on the tailgate and an opposite end on the ground, the plank providing an inclined plane from the ground to the tailgate. However, room for improvement in vehicle tailgate apparatus exists.

DETAILED DESCRIPTION

Disclosed herein is an apparatus for use with a vehicle tailgate. The apparatus includes a base, a first attachment member, a second attachment member and a ramp. The first attachment member and second attachment member are spaced apart from each other and extend from the base. The ramp is irremovably secured to the base. The attachment members are configured to be received in a latch of the vehicle tailgate.

In the following description, relative orientations and direction (by way of example, top bottom, forward, rearward, front, back, outboard, inboard, inward, outward, lateral, left, right) are from the perspective of an occupant seated in a driver seat, facing a dashboard of a vehicle. Orientation and direction relative to the apparatus are given related to when the apparatus is supported on the vehicle as described below and shown in the figures. The adjectives "first" and "second" are used throughout this document as identifiers and are not intended to signify importance or order.

The tailgate 25 is rectangular in shape, and is hingedly supported on the vehicle proximate the vehicle bed, which may include sidewalls. The tailgate 25 pivots between an up, or closed, position and a down, or open position. The tailgate 25 includes a latch mechanism 30 that has a pair of latch portions 33 at opposing ends of the tailgate 25, and a handle 35. In the up position, an attachment portion of the vehicle bed is received in the latch portion 33. The latch maintains the tailgate 25 in the closed position, preventing the tailgate 25 from opening. Actuation of the handle 35 causes the latch portion 33 to open, permitting the tailgate 25 to be opened.

The latch mechanism 30 may include a lock mechanism 37. The lock mechanism 37 has a locked and an unlocked condition. The lock mechanism 37 is transitioned between the locked position and the unlocked position by a user interacting with the lock mechanism 37, for example with a key. In the locked position, the lock mechanism 37 prohibits the latch mechanism 30 from be actuated with the handle 35, thereby inhibiting removal of the attachment portion of the vehicle bed from the latch portion 33.

Figure 1:
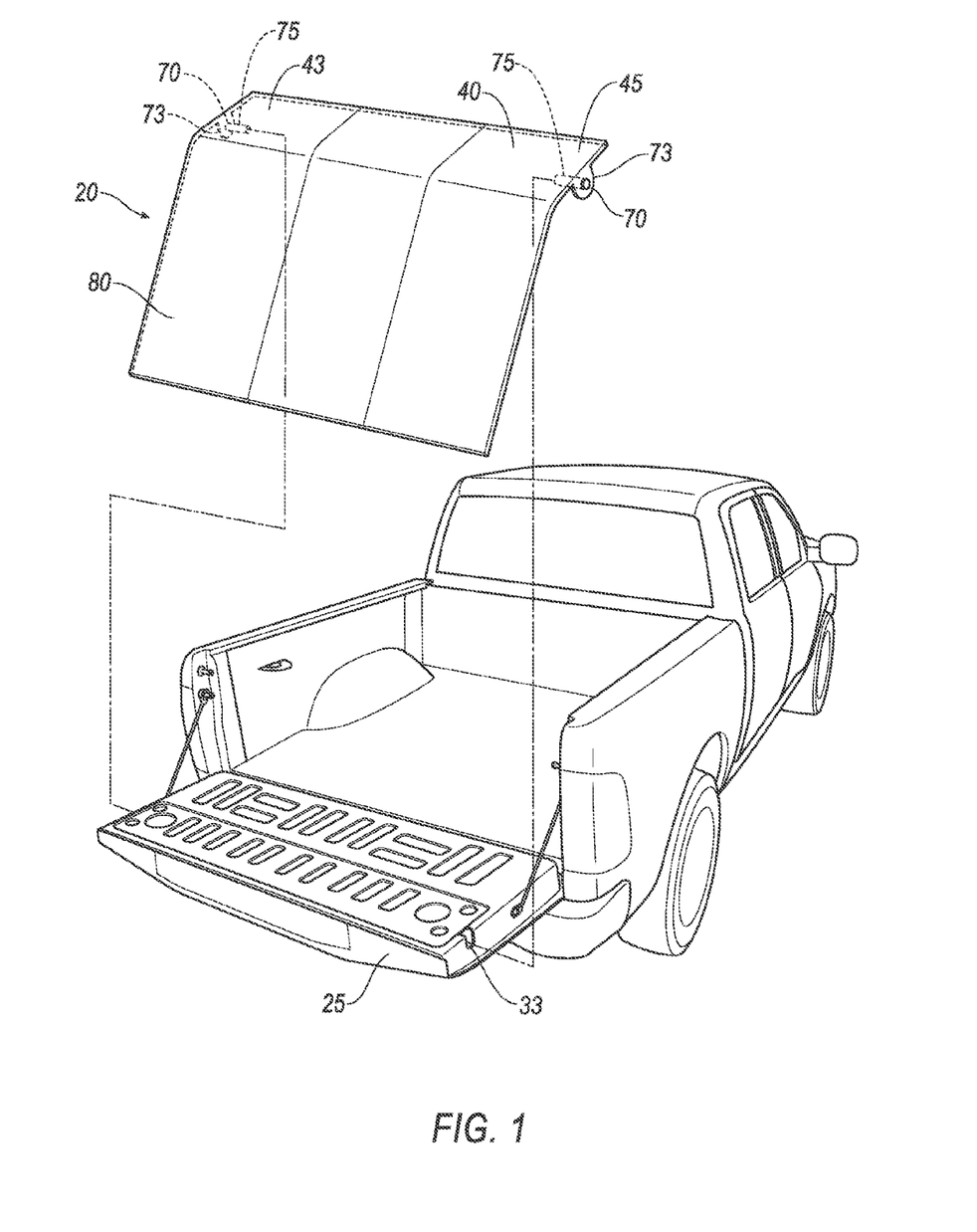
FIG. 1 illustrates a perspective view of a rear of a vehicle and an apparatus having a ramp.
Figure 2:
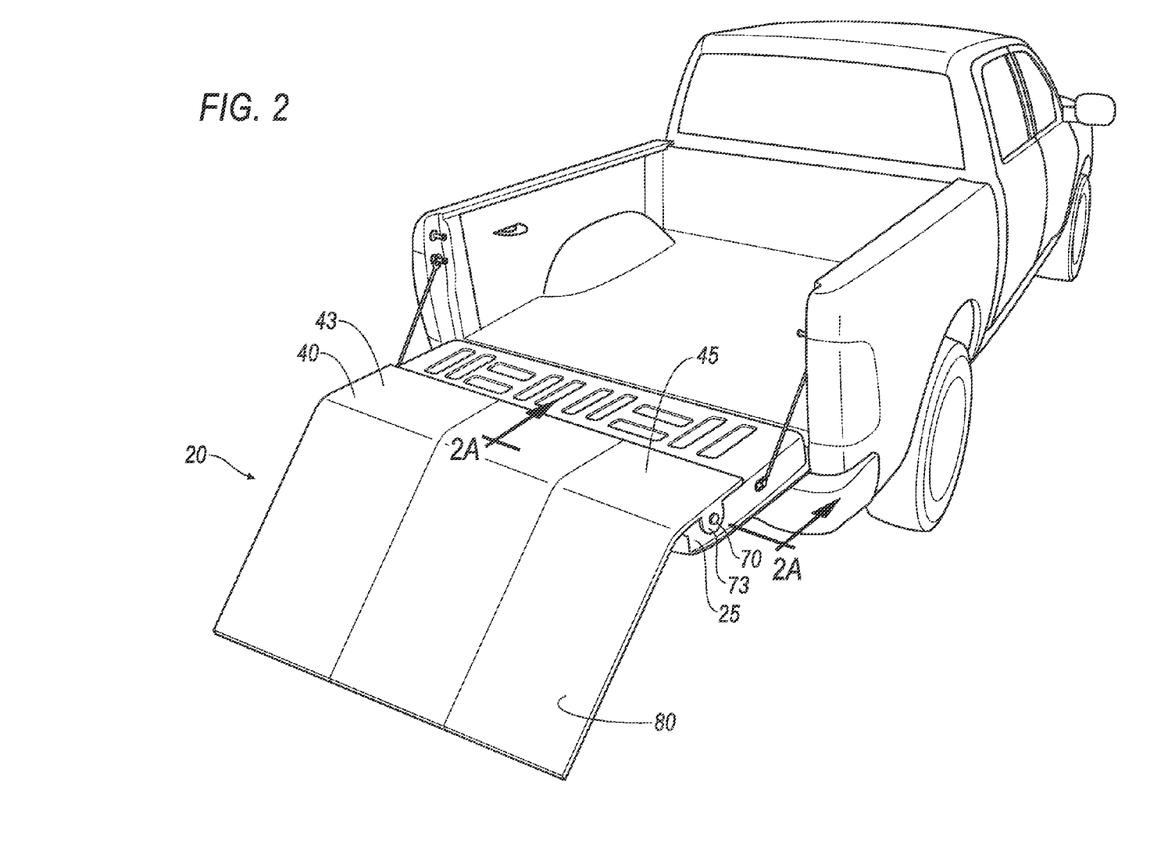
FIG. 2 illustrates a perspective view of the apparatus of FIG. 1 received in a latch of the tailgate.
Figure 2A:
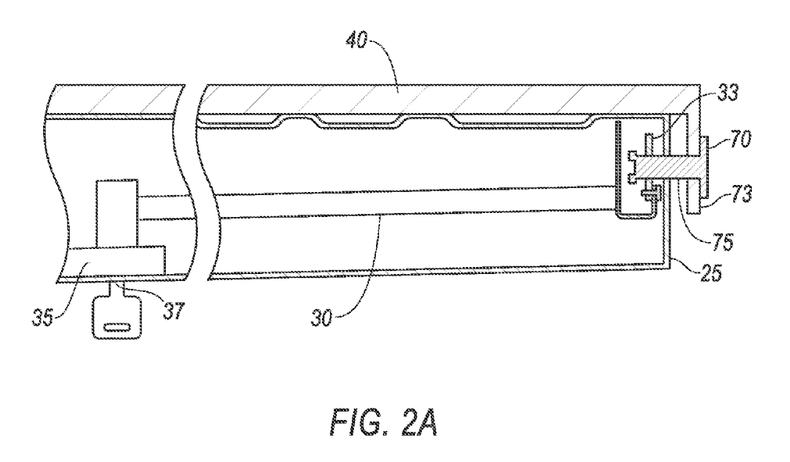
FIG. 2A illustrates a cross-sectional view of a portion of the tailgate and apparatus of FIG. 2.
Figure 3:
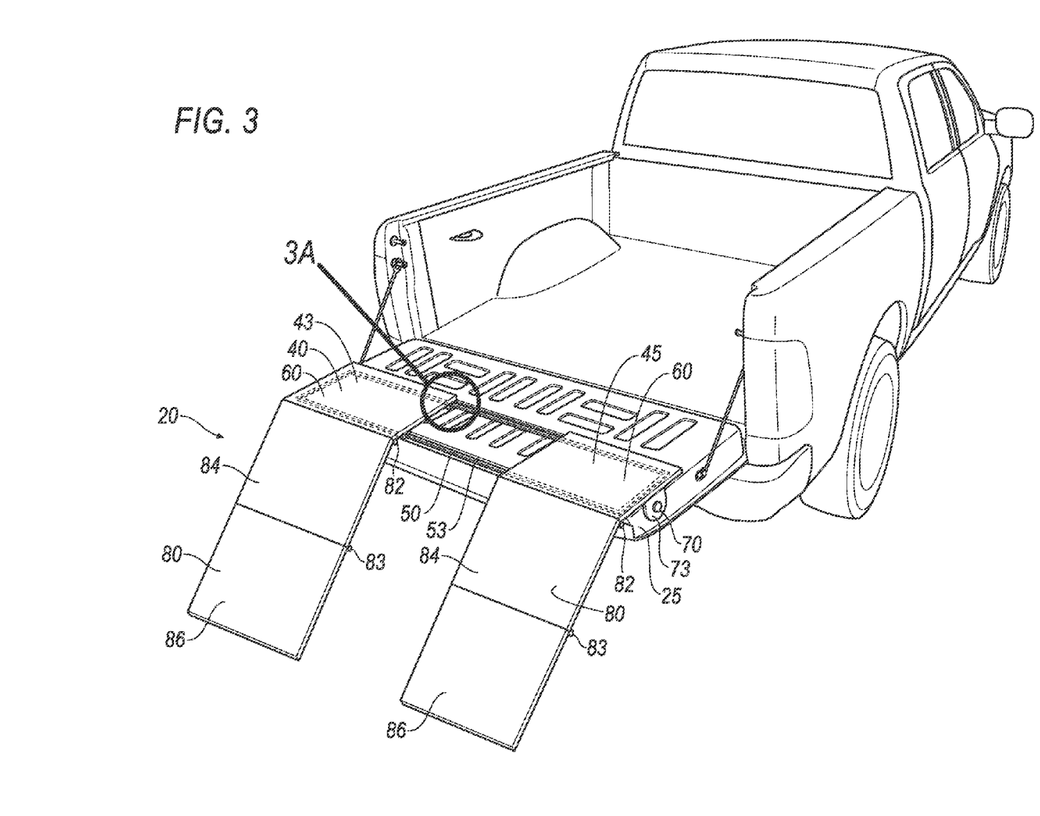
FIG. 3 illustrates a perspective view of another example apparatus received in a latch of a vehicle tailgate.
Figure 3A:
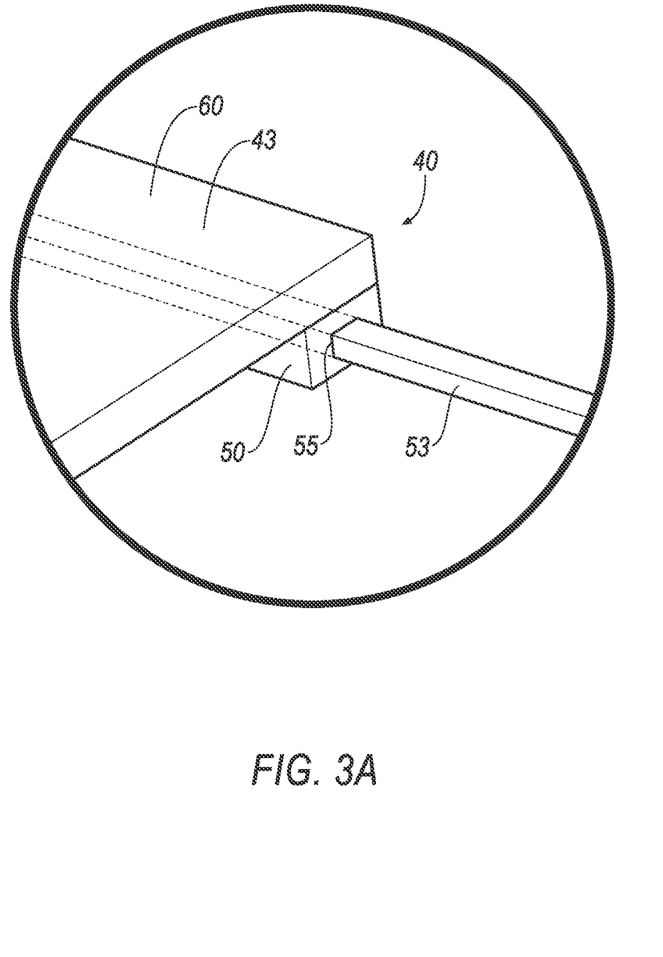
FIG. 3A illustrates a magnified view of a portion of the apparatus of FIG. 3.
Figure 4:
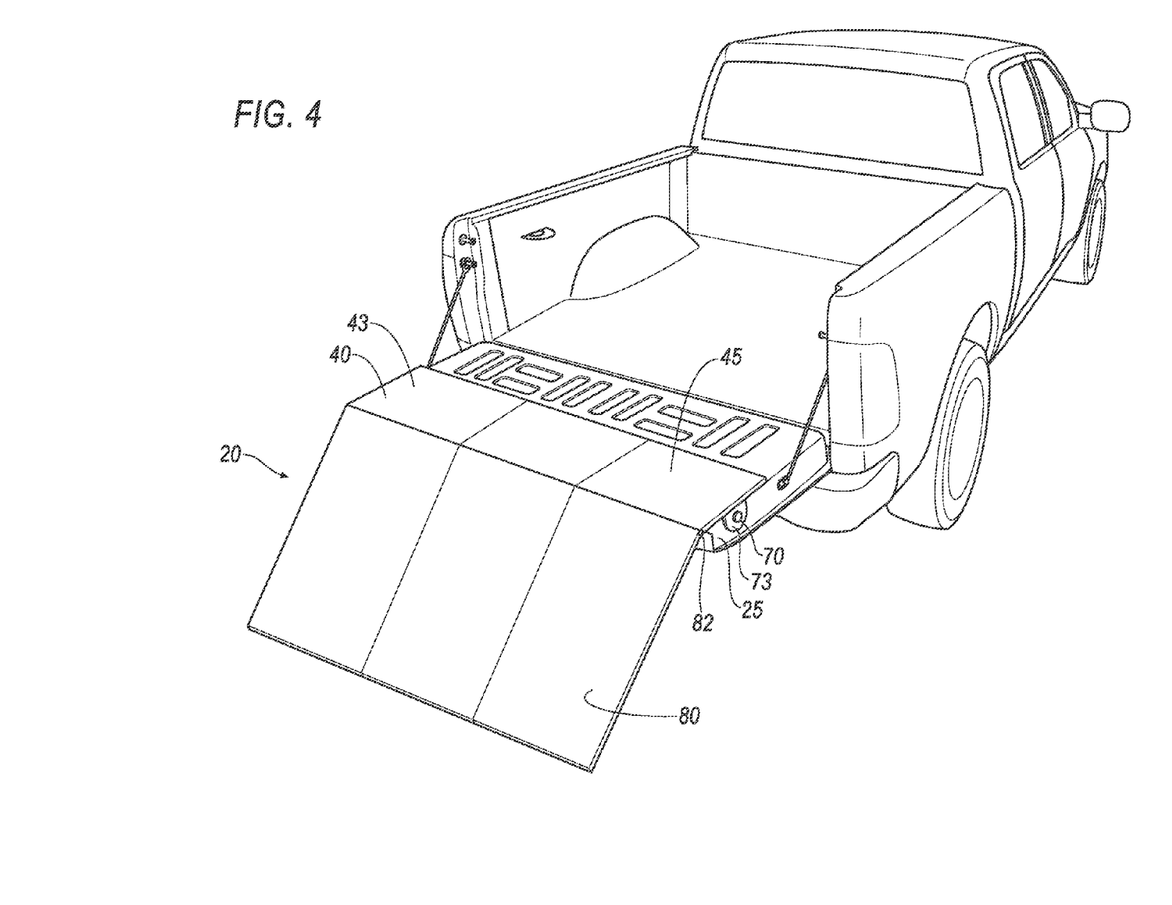
FIG. 4 illustrates a perspective view of another example apparatus received in a latch of a vehicle tailgate.
Figure 5:
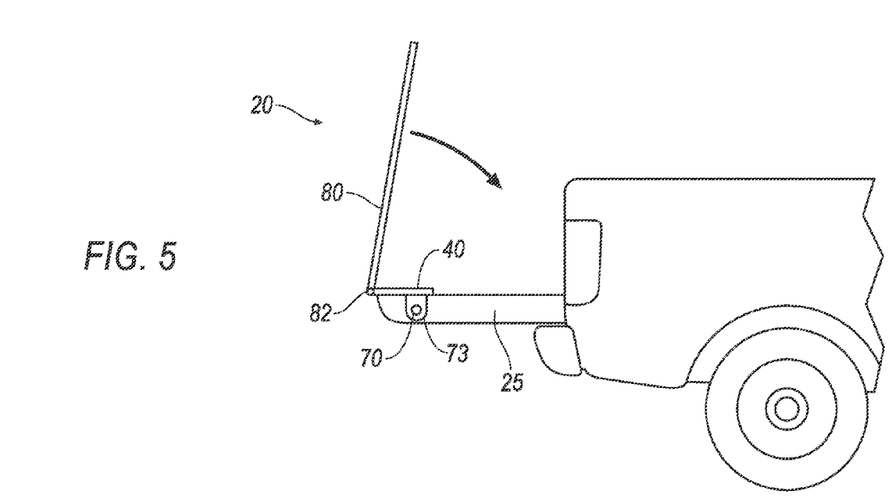
FIG. 5 illustrates a side view of the apparatus of FIG. 4 moving to a folded position.
Figure 6:
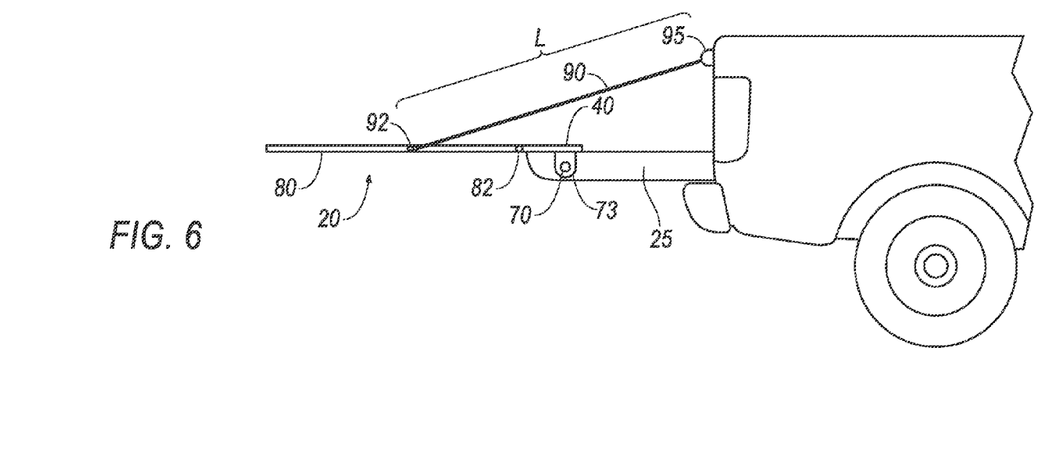
FIG. 6 illustrates a side view of another example apparatus received in a latch of a vehicle tailgate.
Figure 7:
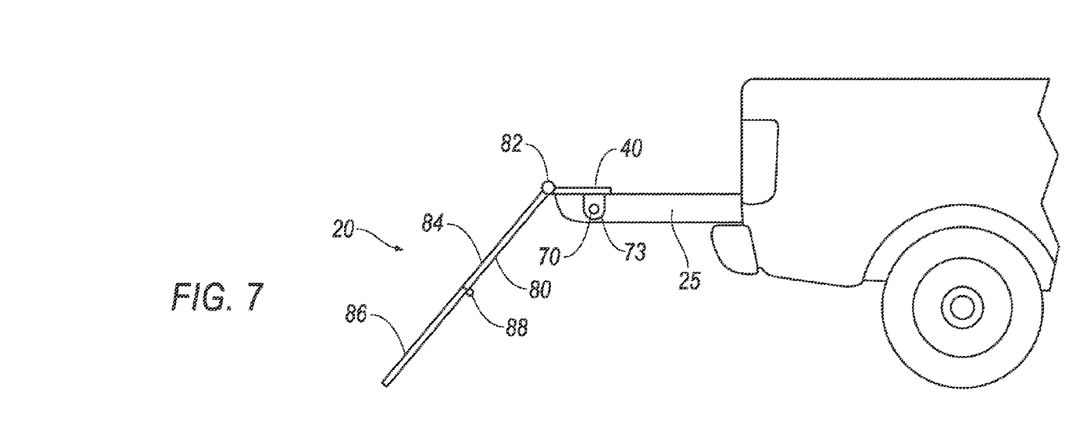
FIG. 7 illustrates a side view of another example apparatus received in a latch of a vehicle tailgate.
Figure 8:
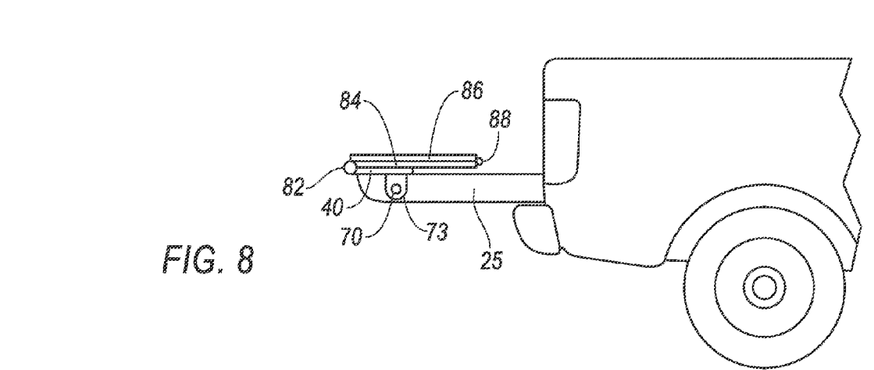
FIG. 8 illustrates a side view of the example apparatus of FIG. 7 in a folded condition.

A first embodiment of the ramp apparatus 20 is shown in FIGS. 1-2A; a second embodiment of the ramp apparatus 20 is shown in FIGS. 3-3A; a third embodiment of the ramp apparatus 20 is shown in FIGS. 4-6; and a fourth embodiment of the ramp apparatus 20 is shown in FIGS. 7-8. Like numerals are used to identify like elements throughout the figures.

The ramp apparatus 20 includes a base 40. The base 40 may include a first portion 43 and a second portion 45. The first portion 43 and the second portion 45 are located at opposite ends of the base 40 in a lateral, or width, direction.

The base 40 may include one or more generally planar portions 60 supported on the frame 50. The generally planar portion 60 has top surface which is solid enough and flat enough surface to allow wheeled vehicles and devices such as 4-wheelers, motorcycles, hand dollies, etc., to be rolled up and into bed of vehicle. The generally planar portion 60 may have various gaps and voids to lighten or reduce the amount of material necessary. For example, the generally planar portion 60 may be formed from sheet steel, expanded steel, a series or grid of tube steel, etc. The generally planar portion 60 may include reinforcement members and may have localized surface changes to provide traction, stability, etc.

With reference to the second embodiment shown in FIGS. 3-3A, the base 40 may include a frame 50 including a support member 53. The support member 53 connects the first portion 43 of the base 40 to the second portion 45 of the base 40. One end of the support member 53 may be slidably received in an aperture 55 located proximate the first portion 43, with an opposite end of the support member secured to the second portion 45 of the base 40. The slideable receipt of the support member 53 in the aperture 55 allows for selective relative moment between the first portion 43 and the second portion 45 in a lateral direction permitting a width of the base 40 to be adjusted.

The frame 50 may be made of square steel tube stock cut and welded into the appropriate shape. The aperture 55 may be defined by the frame formed with a larger size tube stock that the support member 53 such that a cross sectional width and height of an interior of the tube stock defining the aperture 55 is generally equal to a cross sectional width and height of an exterior of the tube stock forming the support member 53. It is appreciated that the aperture 55 will be slightly larger than at least a portion the exterior of the support member 53 such that a slip fit between the two is permitted.

First and second attachment members 70 extend from the base 40. The first and second attachment members are secured to the base 40 spaced apart from each other proximate the first portion 43 and the second portion 45, respectively. Each attachment member 70 includes an extension portion 73 and a locking portion 75.

The extension portion 73 may extend from a bottom surface of the base 40 generally perpendicular to the lateral direction of the base 40. The extension portion 73 may be solid and planar, including an inside and outside surface relative to the base 40.

The locking portion 75 is secured to the extension portion 73 proximate an end of the extension portion 73 opposite the securement to the base 40. The locking portion 75 may have an elongated cylindrical shape. The locking portion 75 may extend generally perpendicular from the inside surface of the extension portion 73 such that the locking portion 75 is generally parallel to the lateral direction of the base 40.

The attachment members 70 are configured to be received in the latch portions 33 of the latch mechanism 30 when the base is supported on the tailgate 25. Receipt of the attachment members 70 in the latch portions 33 helps to stabilize the ramp apparatus 20 on the tailgate 25. For example, to prevent a kick out of the ramp apparatus 20 from reactionary forces generated on the ramp apparatus 20 when a powertrain of a four-wheeler is actuated when the four-wheeler is on the ramp apparatus 20. The attachment members 70 may be configured to be received in the latch portions 33 by the cylindrical shape of the extension portions 73 having a diameter that is small enough to be received in the latch portions 33. The attachment members 70 may be configured to be received in the latch portions 33 by the first and second attachment members 70 being spaced apart at a distance that is generally equal to the distance between the latch portion 33 on opposite ends of the tailgate, or a distance that is generally equal to the width of the tailgate.

The distance between the attachment members 70 may be a predetermined amount based on known widths of various tailgates for specific vehicle models. For example, a 2016 Ford F-150 will have a tailgate of known width and known distance between latch portions. Alternatively, the distance between the attachment members 70 may be adjustable, allowing a user to match a tailgate. For example, the support member 53 may slide within the aperture 55 thereby enabling relative moment between the first portion 43 and the second portion 45 in the lateral direction permitting the width of the base 40 to be adjusted.

With the base 40 supported on the tailgate 25, the attachment members 70 are received in the latch mechanism 30, thereby inhibiting the base 40 from undesired removal from the tailgate 25. To remove the base 40 from the tailgate 25, the handle 35 is actuated to open the latch portions 33. To further inhibit undesired removal from the tailgate 25, the lock mechanism 37 may be placed in the locked condition, thereby inhibiting actuation of the handle 35.

The ramp apparatus 20 includes a generally planar ramp 80. The ramp 80 is irremovably secured to the base 40 such that an edge of the base 40 running in the lateral direction aligns with, and is proximate to, an edge of the ramp 80 running in the lateral direction. When the base 40 is supported on the tailgate 25, the ramp 80 may extend from the base 40 down to the ground supporting the vehicle, such that the ramp 80 is at an obtuse angle relative to the base 40.

As used herein, irremovably secured means being secured such that the ramp 80 is unable to be detached from the base 40 without the use of tools such a wrenches, pliers, cutting devices, etc. For example, the base 40 and the ramp 80 may be integrally formed, i.e., formed together simultaneously to form a single continuous unit, as shown in FIG. 2, by bending a single sheet of steel, or by welding various sheets, tube stock, etc., together. As another example, the base 40 and the ramp 80 may be formed separately and subsequently secured to each other, e.g., by welding, fastening, pinning, etc.

The generally planar ramp 80 has top surface which is solid enough and flat enough surface to allow wheeled vehicles and devices such as 4-wheelers, motorcycles, hand dollies, etc., to be rolled up and into bed of vehicle. The generally planar ramp 80 may have various gaps and voids to lighten or reduce the amount of material necessary. For example, the generally planar ramp 80 may be formed from sheet steel, expanded steel, a series or grid of tube steel etc. The generally planar portion 60 may include reinforcement members and may have localized surface changes to provide traction, stability, etc.

The ramp 80 may be hingedly secured to the base 40 such that the ramp 80 may be pivoted about a hinge 82 connecting the base 40 to the ramp 80, as shown in FIGS. 3-8. The hinge 82 may have a first hinge portion fixed relative to the base 40, a second hinge portion fixed relative to the ramp 80, and a pin connecting the first hinge portion and the second hinge portion. The pin may allow rotational motion of the second hinge portion relative to the first hinge portion. Pivoting the ramp 80 about the hinge 82 allows the ramp 80 to be moved from the above described position where the ramp extends from the base 40 to the ground, to a position where the ramp 80 is supported on the base 40, the tailgate 25 and the bed of the vehicle.

With reference to FIGS. 3, 7 and 8, the ramp 80 may include a first generally planar portion 84 and a second generally planar portion 86. The first portion 84 is hingedly secured to the second portion 86 such that the first portion 84 pivots relative to the second portion 86 about a hinge 88 connecting the first portion 84 to the second portion 86. The hinge 88 is poisoned along a laterally running edge of the first portion 84 and a laterally running edge of the second portion 86. The hinge 88 may have a first hinge portion fixed relative to the first portion 84, a second hinge portion fixed relative to the second portion 86, and a pin connecting the first hinge portion and the second hinge portion. The pin may allow rotational motion of the second hinge portion relative to the first hinge portion. The hinge 88 is configured to limit pivoting of the first portion 84 relative to the second portion 86 to 180 degrees of movement. For example, the hinge 88 may be offset toward a bottom surface of the ramp 80 such that the edge of the first portion 84 proximate the hinge 88 abuts the edge of the second portion 86 proximate the hinge 88 with the ramp 80 is in an open, or extended, position.

With reference to FIG. 6, the ramp apparatus 20 may further include one or more cables 90. One end of the cable 90 may be secured to the ramp 80, and an opposite end of the cable 90 may be secured to the vehicle. For example, the ramp 80 may include one or more eye bolts 92 to which one end of the cable(s) is secured, while the opposite end of the cable 90 may be secured to the attachment portion of the vehicle bed.

The cable 90 may be configured to support the ramp 80 in a pivotal position such that the top surface the base 40 and the ramp 80 generally parallel and align with each other. In other words, the cable 90 may be configured to be connected to the vehicle to support the ramp in a position that is generally parallel to the base 40. For example, the cable 90 may have a fixed length L. Specifically, the cable 90 may be of a predetermined, fixed length based on known dimensions of the base 40 and ramp 80, the location of the cable attachment on the ramp 80, and the location of the attachment portion of the vehicle bed for a specific model vehicle. In another example, the cable 90 may be adjustable in length. One such adjustable length cable 90 includes one end of the cable 90 being received in a retracting lockable spool 95 secured the ramp 80 or the base 40, where adjustment of the cable length alters the angle of the ramp relative to the base.

As used herein, the adverb "generally" modifying an adjective means that a shape, structure, measurement, value, calculation, etc. may deviate from an exact described geometry, distance, measurement, value, calculation, etc., because of imperfections in materials, machining, manufacturing, measurements, etc.

The disclosure has been described in an illustrative manner, and it is to be understood that the terminology which has been used is intended to be in the nature of words of description rather than limitation. Many modifications and variations of the present disclosure are possible in light of the above teachings, and the disclosure mat be practiced otherwise than as specifically described.

The invention claimed is:

1. An apparatus for use with a vehicle tailgate, the apparatus comprising:
   a generally planar base extending in a lateral direction and including an edge elongated in the lateral direction;
   a first attachment member extending from the base;
   a second attachment member extending from the base spaced from the first attachment member;
   the first and second attachment members each including an extension portion and a locking portion, the extension portions extending perpendicular to the planar base, and the locking portions extending perpendicular to the extension portions; and
   a generally planar ramp including an edge elongated in the lateral direction, the edge of the ramp irremovably secured to the edge of the base;
   wherein the attachment members are configured to be received in a latch of the vehicle tailgate.

2. The apparatus of claim 1, wherein the locking portion has an elongated cylindrical shape.

3. The apparatus of claim 1, wherein the base and ramp are integrally formed.

4. The apparatus of claim 1, wherein the ramp is hingedly secured to the base.

5. The apparatus of claim 4, further comprising a cable secured to the ramp.

6. The apparatus of claim 5, wherein the cable is configured to be connected to the vehicle to support the ramp is a position that is generally parallel to the base.

7. The apparatus of claim 5, wherein the cable is adjustable in length.

8. The apparatus of claim 5, wherein the cable has a fixed length.

9. The apparatus of claim 1, wherein the ramp includes a first portion and a second portion, with the first portion hingedly secured to the second portion.

10. The apparatus of claim 9, wherein a hinge securing the first portion to the second portion is limited to 180 degrees or less of movement.

11. The apparatus of claim 1, further comprising:
    the base comprising a first portion and a second portion; and
    a support member connecting the first portion to the second portion.

12. The apparatus of claim 1, wherein the base comprises:
    a frame portion supporting a generally planar portion.

13. The apparatus of claim 12, wherein the frame defines an aperture and includes a support member, the support member is slidably received in an aperture of the frame supporting a first portion of the base.

14. An assembly comprising:
    a tailgate including a latch;
    a generally planar base extending in a lateral direction and including an edge elongated in the lateral direction supported on the tailgate;
    a first attachment member extending from the base;
    a second attachment member extending from the base and spaced from the first attachment member;
    the first and second attachment members each including an extension portion and a locking portion, the extension portions extending perpendicular to the planar base, and the locking portions extending perpendicular to the extension portions; and
    a generally planar ramp including an edge elongated in the lateral direction, the edge of the ramp irremovably secured to the edge of the base;
    wherein the attachment members are configured to be received in the latch of the tailgate.

15. The assembly of claim 14, wherein the locking portion has an elongated cylindrical shape.

16. The assembly of claim 14, wherein the base and ramp are integrally formed.

17. The assembly of claim 14, wherein the ramp is pivotally secured to the base.

18. The assembly of claim 14, further comprising a cable secured to the ramp, wherein the cable is configured to secure to a vehicle to support the ramp is a position that is generally parallel to the base.

19. The assembly of claim 14, wherein the tailgate includes a locking device configured to lock the latch to prohibit removal of the first attachment member from the latch.

20. The assembly of claim 14, further comprising:
    the base comprising a frame and a first planar portion supported on the frame and a second portion supported on the frame; and
    the frame defining an aperture and including a support member;
    wherein the support member is slidably received in an aperture of the frame proximate the first portion of the base.

* * * * *